United States Patent [19]

Takahashi

[11] Patent Number: 4,468,570
[45] Date of Patent: Aug. 28, 1984

[54] HYDRAULIC DYNAMIC ELECTRIC MACHINE

[75] Inventor: Kengo Takahashi, Hitachi, Japan

[73] Assignee: Hitachi, Ltd., Tokyo, Japan

[21] Appl. No.: 368,000

[22] Filed: Apr. 13, 1982

[30] Foreign Application Priority Data

Apr. 14, 1981 [JP] Japan .................................. 56-55991

[51] Int. Cl.³ .......................... F03B 11/06; H02K 7/08
[52] U.S. Cl. ........................................ 290/52; 310/90; 415/111
[58] Field of Search .................... 290/52; 310/157, 90; 415/110–113

[56] References Cited

U.S. PATENT DOCUMENTS 141,826  8/1873  Stetson ................................ 415/111
803,678  11/1905  Emmet .................................. 290/52
3,097,023  7/1963  Nojima ................................ 415/111

Primary Examiner—J. V. Truhe
Assistant Examiner—Shelley Wade
Attorney, Agent, or Firm—Antonelli, Terry & Wands

[57] ABSTRACT

A hydraulic dynamic electric machine comprising a rotary portion including a rotary shaft and an electromagnet adapted to rotate together with the rotary shaft, a water wheel connected to a lower portion of the rotary shaft and adapted to drive the rotary portion, and a thrust bearing for bearing the thrust produced by the rotary portion and the water wheel, with the thrust bearing being disposed below the water wheel and having hydrostatic type bearing pad which makes use of pressurized water as the lubricant.

7 Claims, 8 Drawing Figures

HYDRAULIC DYNAMIC ELECTRIC MACHINE

BACKGROUND OF THE INVENTION

The present invention relates to a hydraulic dynamic electric machine and, more particularly, to a hydraulic dynamic electric machine having a thrust bearing.

Generally, a hydraulic dynamic electric machine has a dynamic electric machine and a water wheel connected to the lower end of the shaft of the dynamic electric machine so as to drive the dynamic electric machine to thereby generate electric power. As shown in FIGS. 1 and 2, a vertical type hydraulic dynamic electric machine includes a dynamic electric machine 30 and a water wheel 2 connected to the shaft of the dynamic electric machine 30, with a penstock 17 for supplying the water wheel 2 with the hydraulic power being in communication with a dam 15. The dynamic electric machine is provided with a thrust bearing for bearing the axial thrust force and an electromagnetic means 1 is provided at an upper portion of the rotary shaft 3 having a vertical axis. The water wheel 2 is connected to the lower end of the rotary shaft 3. Un upper journal bearing 5 and a lower journal bearing 6 are disposed at both axial ends of the rotary shaft 3. A thrust bearing is provided at a lower portion of the electromagnetic means 1. The thrust bearing 4 is constituted by a thrust bearing collar 8 fixed to the rotary shaft 3 through a collar fixing ring 7, a bearing pad 4a for making sliding contact with the collar 8 and a support adapted to support the bearing pad 4a. The support is carried by a thrust bracket 9 secured to a base 10. Usually, lubrication oil is supplied to the sliding surface between the bearing pad 4a and the thrust bearing collar 8 to permit a smooth sliding movement between two sliding surfaces to thereby bear the thrust force efficiently and safely.

This conventional thrust bearing 4 has the following desadvantages. Namely, since the lubricant supplied to the sliding surface is a lubricating oil having a considerably high viscosity, a large loss of energy is consumed in the thrust bearing due to the resistance imposed by the lubrication oil. In addition, since the thrust bearing is disposed above the water wheel 2, it is necessary to use the thrust bracket 9 for supporting the thrust bearing 4. Furthermore, the electric machine is liable to be affected adversely by a leak of the lubrication oil. A troublesome work is required for suitably maintaining the performance of the lubrication oil. Thus, the problems in the conventional thrust bearing are all attributable to the position of the thrust bearing and the use of the lubrication oil. This gives a rise to the demand for a thrust bearing which is entirely free from the problems attributable to the position of the thrust bearing and the use of the lubrication oil.

SUMMARY OF THE INVENTION

Accordingly, an object of the invention is to provide a hydraulic dynamic electric machine having a thrust bearing which is easy to maintain and which causes small loss of energy.

To this end, according to the invention, a hydraulic dynamic electric machine is provided having a thrust bearing disposed below the water wheel and at the lower end of the rotary shaft, the thrust bearing being of hydrostatic type which makes use of pressurized water.

DESCRIPTION OF THE PREFERRED EMBODIMENTS

Figure 1:
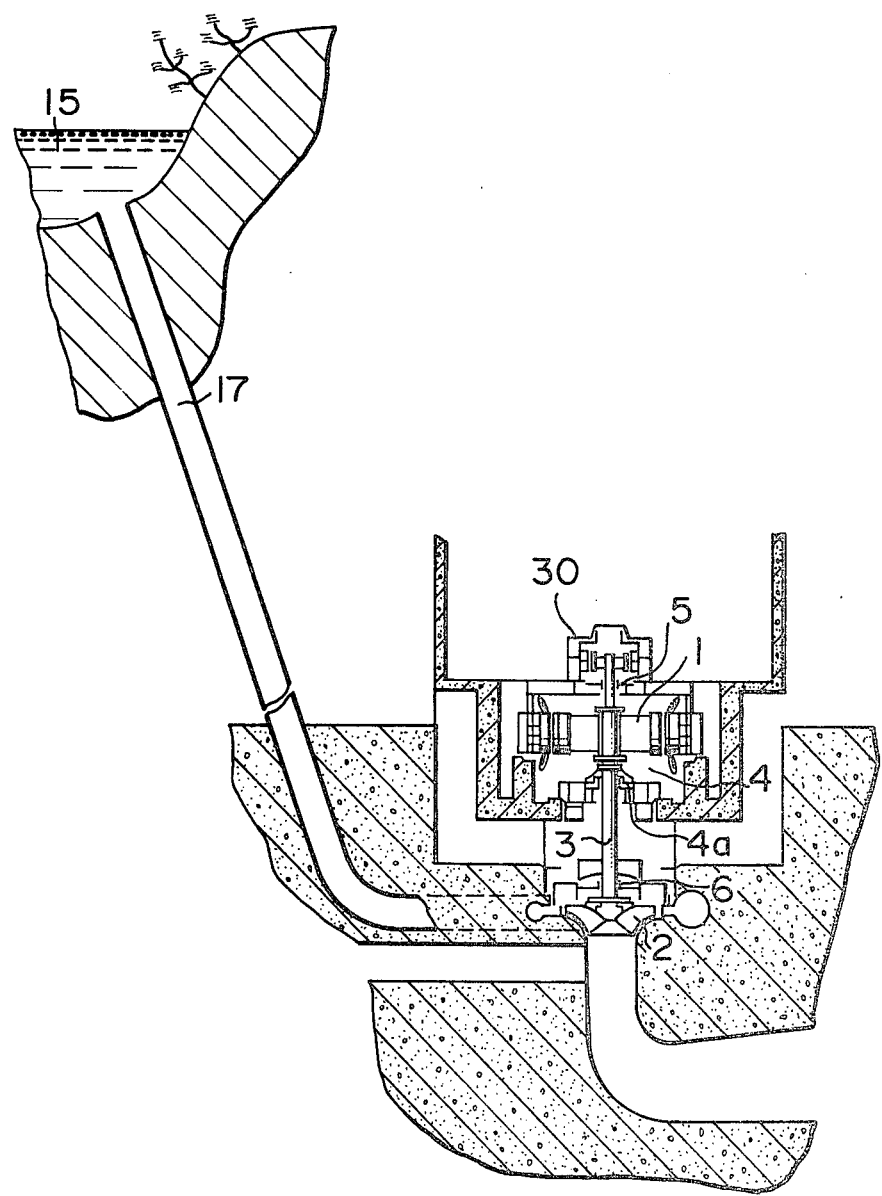
FIG. 1 is a vertical sectional view of a conventional hydraulic dynamic machine.
Figure 2:
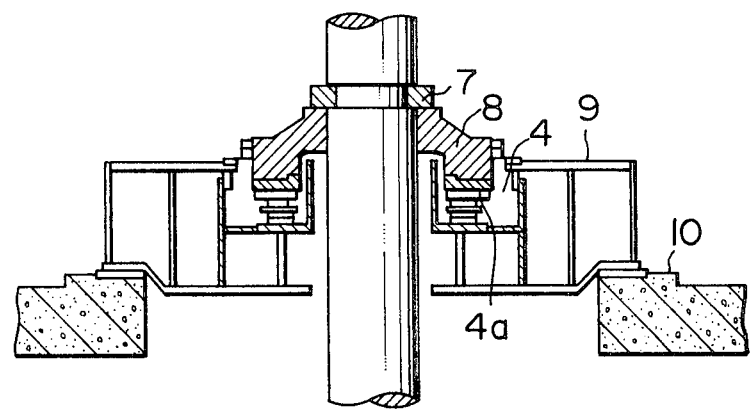
FIG. 2 is an enlarged vertical sectional side elevational view of the thrust bearing portion of the hydraulic dynamic electric machine shown in FIG. 1.

Referring now to the drawings wherein like reference numerals are used throughout the various views to designate like parts and, more particularly, to FIGS. 3-7, according to these figures, a hydraulic dynamic electric machine includes, a thrust bearing 12 disposed below the water wheel 2 and at the lower end of a rotary shaft 13. In addition, the water of high pressure coming down from a dam 15 is introduced to the sliding surfaces of the bearing pad 12a and the thrust bearing collar 14 to form a film of pressurized water which bears the thrust force of the electric machine. Thus, the thrust bearing 12 is of so-called hydrostatic type bearing. Water of a high pressure is supplied to the sliding surface of the thrust pad 12a of the thrust bearing 12 from a dam 15 positioned at a high position to provide a sufficient head H, through a pressurized water passage 11 provided with a water control valve 16. The water wheel 2 is supplied with the water of high pressure from the dam 15 through the penstock 17 which is separate from the pressurized water passage 11.

Figure 4:
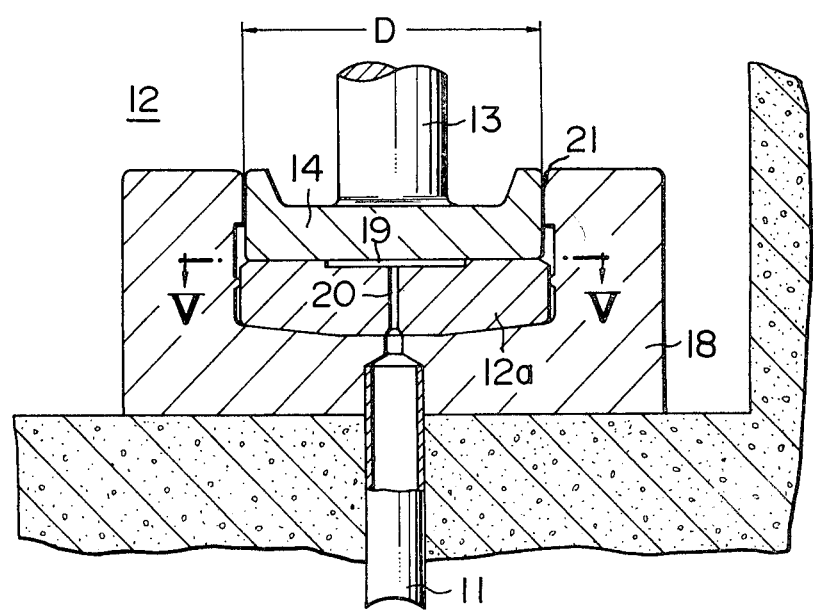
FIG. 4 is an enlarged vertical sectional side elevational view of the thrust bearing of the hydraulic dynamic electric machine shown in FIG. 3.
Figure 3:
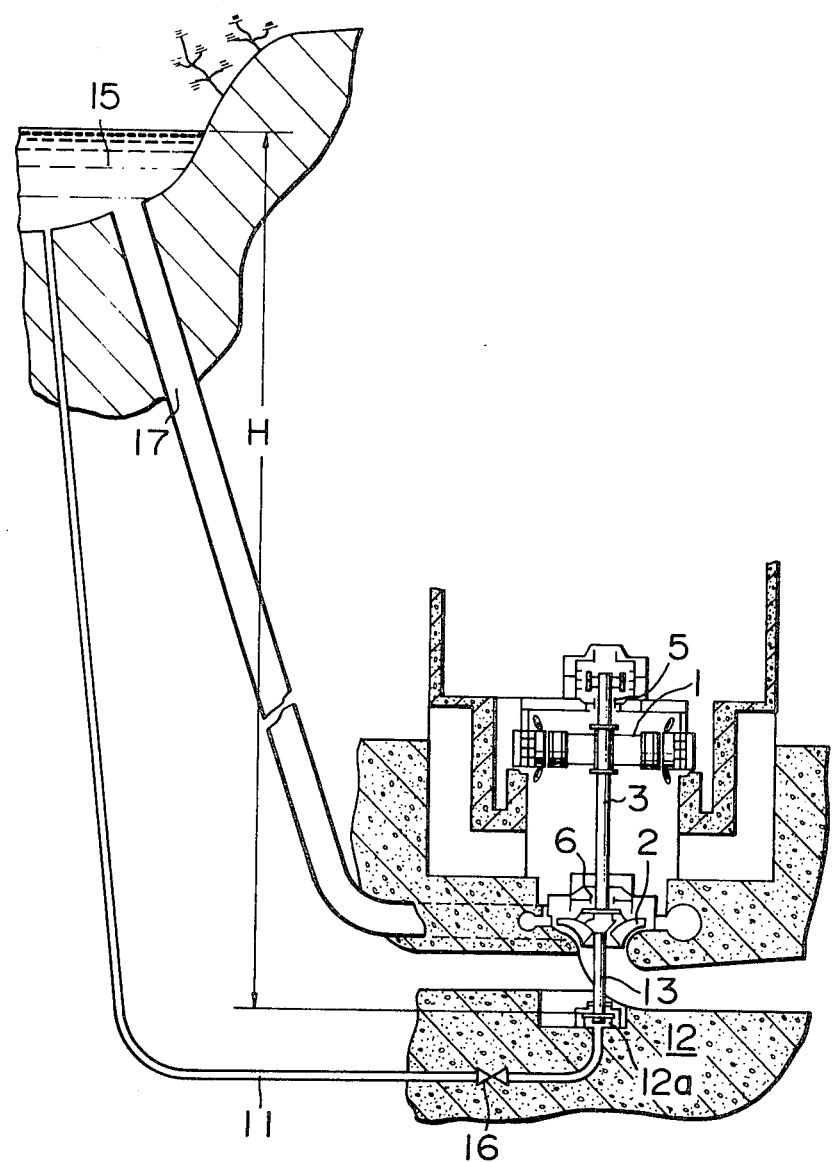
FIG. 3 is a vertical sectional side elevational view of a hydraulic dynamic electric machine in accordance with an embodiment of the invention.

As shown in FIG. 4, the thrust bearing 12 includes a thrust bearing collar 14, having an outside diameter D, is fixed to the lower end of the rotary shaft 13 which extends downwardly from the water wheel 2. A bearing pad 12a is disposed below the thrust bearing collar 14 to make a sliding contact with the lower surface of the thrust bearing collar 14. The thrust bearing collar 14 and the bearing pad 12a are encased by the bearing base 18. In order to absorb any tilt of the rotary shaft 13, the bearing pad 12a makes a spherical contact with the bearing base 18.

The pressurized water passage 11 leading from the dam 15 is disposed at the center of the lower part of the bearing base 18. A water passage hole 20 is formed through the bearing pad 12a from the center of lower surface thereof, so as to provide a communication between the pressurized water passage 11 and a bearing dam 19 provided in the sliding surface of the bearing pad 12a. A water seal surface 21 is formed between the bearing base 18 and the thrust bearing collar 14 so as to avoid any leak of the pressurized water supplied to the bearing dam 19.

Figure 5:
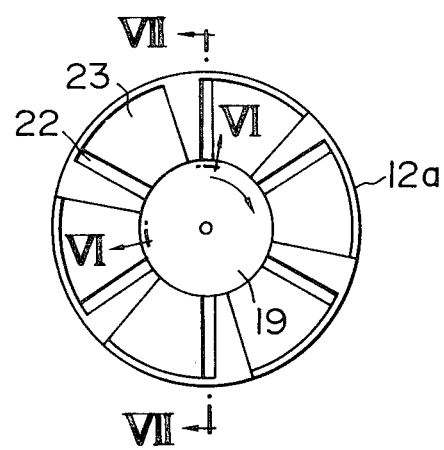
FIG. 5 is a plan view taken along the line V—V of FIG. 4.
Figure 6:
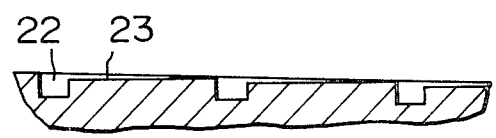
FIG. 6 is a sectional view taken along the line VI—VI of FIG. 5.
Figure 7:
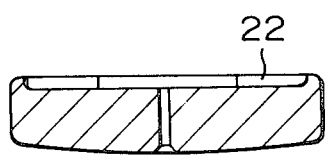
FIG. 7 is a sectional view taken along the line VII—VII of FIG. 5.

As shown most clearly in FIGS. 5 thru 7, the bearing pad 12a is provided in its sliding surface with a plurality of bottom-equipped grooves 22 extending radially from the bearing dam 19 and end in the sliding surface, and inclined surfaces 23 inclined in the circumferential direction from the bottom-equipped grooves 22.

In the operation of the trust bearing 12, the pressurized water in the pressurized water passage 11 is supplied to the bearing dam 19 through the water passage holes 20. The pressurized water thus supplied to the bearing dam 19 further comes to contact the inclined surface 23 through the bottom-equipped grooves 22. The pressurized water thus supplied to the entire region of the sliding surface of the bearing pad 12a forms a liquid film of a high pressure which supports the thrust bearing collar 14 in a floating manner. Consequently, the thrust force of the hydraulic dynamic electric machine is borne by the force generated by the pressure of the pressurized water. According to the invention, since the thrust bearing is of hydrostatic type as described, the maintenance work is considerably facilitated as compared with the case of the conventional thrust bearing using lubrication oil as the lubricant. In addition, the water having low viscosity imposes only a light loss of energy in the thrust bearing. Furthermore, the thrust bracket is dispensed with because the thrust bearing itself is disposed at the lower end of the rotary shaft 13.

The high pressure of the pressurized water coming out of the bearing pads 12a is maintained by the water sealing surface 21 which serves to prevent the water from leaking to the outside. The thrust supporting force F is given by the following equation:

$$F = (\pi/4)D^2 p$$

where:
 $p = \gamma H$ pressure of pressurized water (kg/cm$^2$)
 $\gamma$: specific weight of water ($= 0.001$ kg/cm$^3$);
 H: head of pressurized water (m); and
 D: diameter of bearing (bearing pad) (mm).

By way of example, the required outside diameter D of the bearing pad will be calculated in accordance with the equation above, on the assumption that the thrust load is 1000t and the water head is 800 m.

The water pressure p is calculated as follows:

$$P = \gamma H = 0.001 \times 800 \times 10^2 = 80 \text{ kg/cm}^2$$

The required diameter D of the bearing, therefore, is calculated as follows.

$$D = 10 \times \sqrt{\frac{4F}{\pi P}} \times 10^3 = 10 \times \sqrt{\frac{4}{\pi} \times \frac{1000 \times 10^3}{\pi \times 80}} \approx 1260$$

The calculated diameter is reasonable because the diameter of the thrust bearing of the hydraulic dynamic electric machine of the assumed class usually has a diameter around 1,000.

Actually, there is a slight drop of the water pressure p on the sliding surface due to the leak of pressurized water from the water sealing surface 21. This problem, however, can be minimized by improving the sealing power of the water sealing surface 21 and by increasing the size of the pressurized water passage 11.

Figure 8:
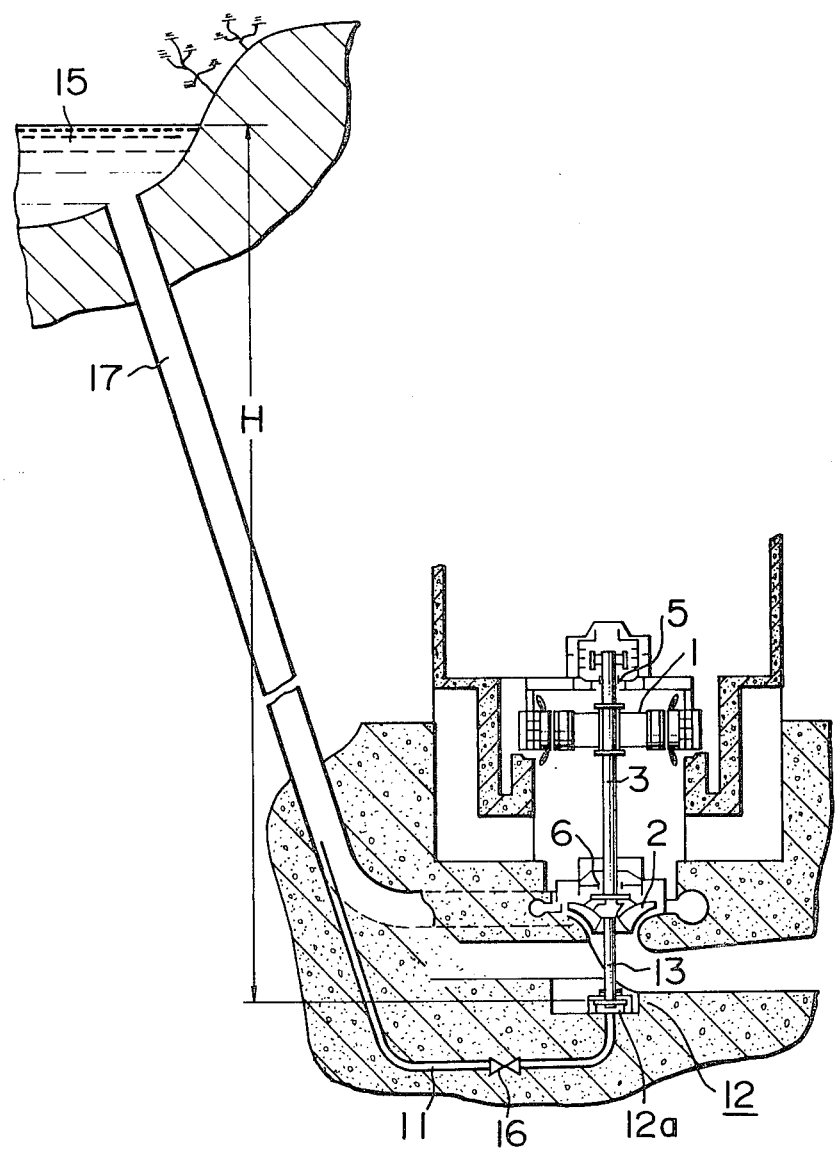
FIG. 8 is a vertical sectional side elevational view of a hydraulic dynamic electric machine in accordance with another embodiment of the invention.

In FIG. 8 the pressurized water to be supplied to the thrust bearing is derived from the penstock 17 for supplying the pressurized water to the water wheel 2. That is, the pressurized water passage 11 for the thrust bearing 12 is branched from the penstock 17. Clearly, this embodiment facilitates the construction work for laying the pressurized water passage 11 as compared with the first embodiment.

As has been described, in the hydraulic dynamic electric machine of the invention, a thrust bearing of hydrostatic type making use of pressurized water as the lubricant is disposed below the water wheel and at the lower end of the rotary shaft. Consequently the thrust bracket and the lubricating oil which are indispensable in the conventional hydraulic dynamic electric machine are completely dispensed with. The thrust is effectively borne by the pressurized water supplied from the dam, so that the maintenance of the thrust bearing is facilitated and the loss of energy in the thrust bearing is advantageously decreased.

What is claimed is:

1. A hydraulic dynamic electric machine comprising: a rotary shaft having a vertical axis, an electromagnetic means provided on an upper portion of the rotary shaft, a water wheel connected to a lower portion of said rotary shaft and being adapted to be driven by water pressure produced by a water head of a dam, and a thrust bearing provided on a lower end of said rotary shaft below said water wheel for bearing a thrust load on said rotary shaft, said thrust bearing is of a hydrostatic type making use of a pressurized water as a lubricant, and water passage means for communicating said thrust bearing with said dam in such a manner that a bearing force of said thrust bearing is produced by a difference of the water head between said dam and said thrust bearing.

2. A hydraulic dynamic electric machine as claimed in claim 1, wherein said thrust bearing includes a thrust bearing collar fixed to the lower end of said rotary shaft, a bearing pad adapted to make sliding engagement with said thrust bearing collar, and a bearing base supporting said bearing pad and encasing said bearing pad and said thrust bearing collar.

3. A hydraulic dynamic electric machine as claimed in claim 2, wherein a water sealing surface is provided between an outer peripheral surface of said thrust bearing collar and said bearing base.

4. A hydraulic dynamic electric machine as claimed in claim 2, wherein an acial contact between said bearing pad and said bearing base is made through a spherical contact surface.

5. A hydraulic dynamic electric machine comprising: a rotary shaft having a vertical axis, an electromagnetic means provided on an upper portion of the rotary shaft, a water wheel connected to a lower portion of said rotary shaft, and a thrust bearing for bearing the thrust load on said rotary shaft, characterized in that said thrust bearing is of a hydrostatic type making use of pressurized water as a lubricant, said thrust bearing is disposed below said water wheel and provided at a lower end of the rotary shaft, said thrust bearing includes a thrust bearing collar fixed to the lower end of the rotary shaft, a bearing pad adapted to make sliding engagement with said thrust bearing collar, and a bearing base supporting said bearing pad and encasing said bearing pad and said thrust bearing collar, said thrust bearing further includes a bearing dam adapted to supply pressurized water between the sliding surfaces of said thrust bearing collar and said bearing pad, a plurality of bottom-equipped grooves extending radially from said bearing dam to have ends in an area of said sliding surfaces, and inclined surfaces extending from said bottom-equipped grooves at an inclination in a circumferential direction.

6. A hydraulic dynamic electric machine as claimed in claim 5, wherein said thrust bearing includes a passage for supplying pressurized water to said bearing dam, said passage having a pressurized water passage communicated through a water control valve with a penstock from a dam and extending through said bearing base, and water passage holes formed in said bearing pad to provide a communication between said pressurized water passage and said bearing dam.

7. A hydraulic dynamic electric machine as claimed in claim 5, wherein said thrust bearing includes a passage for supplying pressurized water to said bearing dam, said passage having a pressurized water passage between said dam and said bearing base through a water control valve, and water passage holes formed in said bearing pad so as to provide a communication between said water passage and said bearing dam.

* * * * *